United States Patent [19]

Minami

[11] Patent Number: 5,320,654

[45] Date of Patent: Jun. 14, 1994

[54] AIR CLEANER FOR COOLING DEVICE IN DRIVING SYSTEM MOUNTED ON LARGE SIZE DUMP TRUCK

[75] Inventor: Teruo Minami, Kanagawa, Japan

[73] Assignee: Kabushiki Kaisha Komatsu Seisakusho, Japan

[21] Appl. No.: 958,120

[22] PCT Filed: Jul. 4, 1991

[86] PCT No.: PCT/JP91/00904

§ 371 Date: Dec. 23, 1992

§ 102(e) Date: Dec. 23, 1992

[87] PCT Pub. No.: WO92/00860

PCT Pub. Date: Jan. 23, 1992

[30] Foreign Application Priority Data

Jul. 6, 1990 [JP] Japan .................................. 2-71498

[51] Int. Cl.$^5$ .............................................. B01D 45/12
[52] U.S. Cl. ........................................ 55/347; 55/418
[58] Field of Search ............................ 55/345–349, 55/418

[56] References Cited

U.S. PATENT DOCUMENTS

| | | | |
|---|---|---|---|
| 2,004,468 | 6/1935 | Hawley | 55/347 |
| 3,104,961 | 9/1963 | Westlin | 55/346 X |
| 3,421,296 | 1/1969 | Beurer, Sr. | 55/347 X |
| 3,425,192 | 2/1969 | Davis | 55/345 |
| 3,449,891 | 6/1969 | Shohet et al. | 55/347 X |
| 3,483,676 | 12/1969 | Sargisson | 55/438 X |
| 3,915,679 | 10/1975 | Roach et al. | 55/347 |
| 4,218,223 | 8/1980 | Lidstone et al. | 55/1 |
| 4,242,115 | 12/1980 | Harold et al. | 55/347 |
| 4,394,145 | 7/1983 | Sundseth | 55/348 X |
| 4,409,663 | 10/1983 | Hawley | 55/348 X |

FOREIGN PATENT DOCUMENTS

| | | | |
|---|---|---|---|
| 556025 | 4/1958 | Canada | 55/345 |
| 729368 | 12/1942 | Fed. Rep. of Germany | 55/347 |
| 52-17845 | 4/1977 | Japan . | |
| 57-38302 | 8/1982 | Japan . | |
| 61-15050 | 1/1986 | Japan . | |
| 1017417 | 1/1966 | United Kingdom | 55/346 |
| 2080155 | 2/1982 | United Kingdom . | |

Primary Examiner—Robert Spitzer
Attorney, Agent, or Firm—Ronald P. Kananen

[57] ABSTRACT

An air cleaner for a cooling device in a driving system mounted on a large-size dump truck capable of separating and removing dust and rain water contained the air flow flowing in through an air intake portion from the air with a high efficiency. This air cleaner for cooling comprises a plurality of strata tubes (12) horizontally spanning between front and rear walls (1a, 1b) of a rectangular parallelepiped shape intake portion (1), a net pasted over the entire surface of the front of the intake portion, and a cover disposed in front of the net.

5 Claims, 6 Drawing Sheets

FIG. 2
FIG. 3
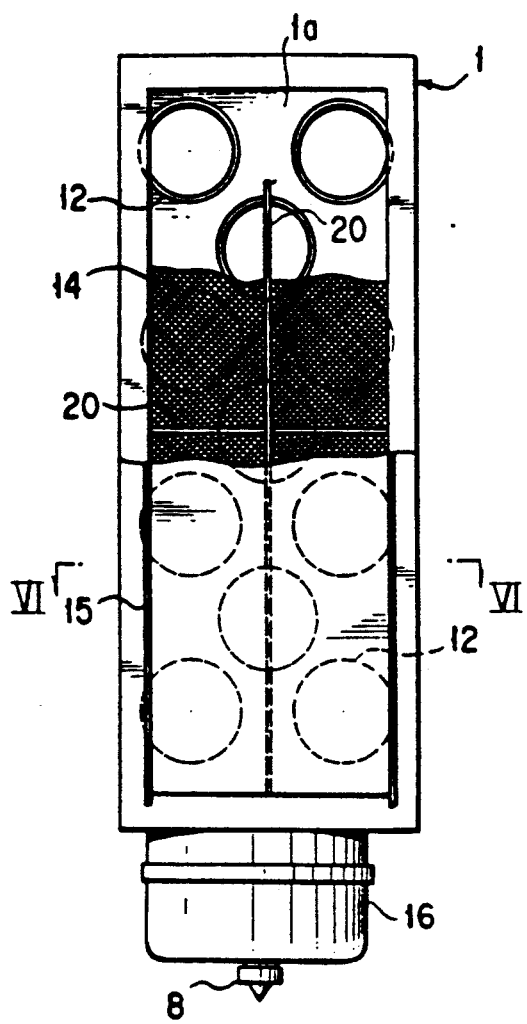
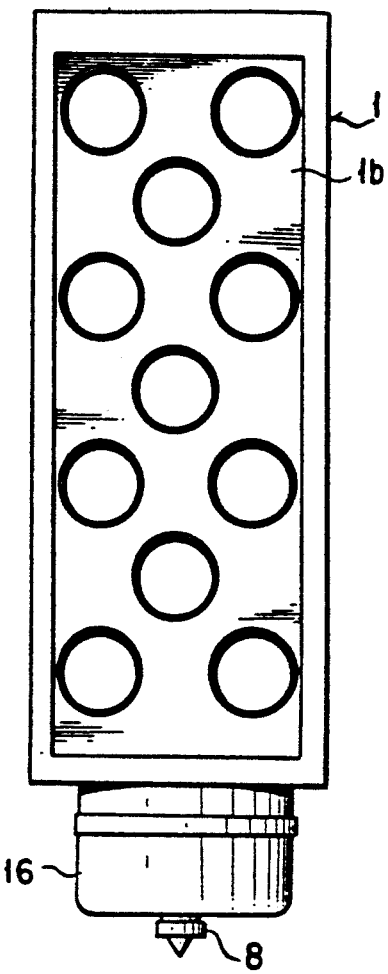
FIG. 4
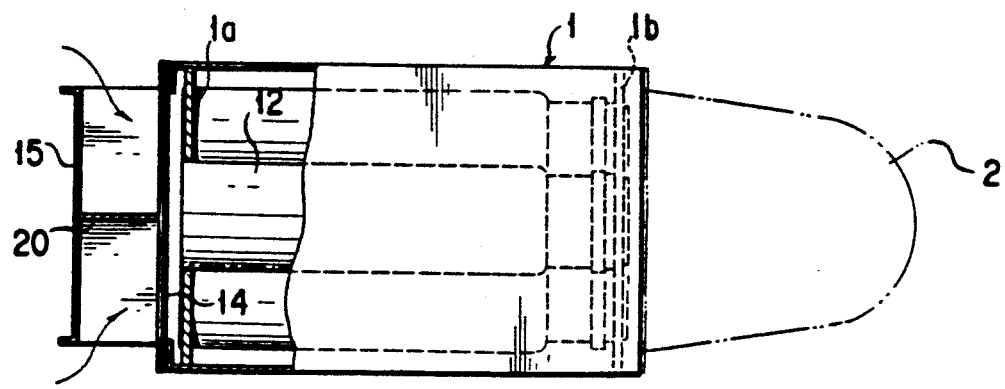

AIR CLEANER FOR COOLING DEVICE IN DRIVING SYSTEM MOUNTED ON LARGE SIZE DUMP TRUCK

FIELD OF THE INVENTION

The present invention relates generally to a driving system cooling device mounted on an electrically powered contructional large size dump truck. More specifically, invention relates to an air cleaner for the cooling device to be provided at an air intake for a cooling air and for separating and removing dust and rain water from an intake air.

BACKGROUND OF THE INVENTION

An air cooling device for a driving system is mounted on an electrically powered contructional large size dump truck which are used in a mine, a quarry and so forth. The cooling device has an air intake at the front side of the vehicle. An air introduced through the air intake is fed to a generator, drive control device and a motor through an air passage for cooling the driving system.

As shown in FIGS. 8 and 9, the cooling device is provided with an air cleaner within an air intake 1 for separating a dust, such as a sand or so forth and rain water from the air for feeding only air to the downstream. Conventionally, a louver array 6 is employed in the air cleaner. A plurality of louver arrays 6 are provided within the air intake 1 in such a manner that distances thereof are narrowed toward the downstream side. Dust shoots 7 are provided between the narrowed ends of the louver arrays 6. The air introduced from the front side of the vehicle, i.e. from an air inlet side flows into spaces between the louver arrays 6. The air flows through gaps in the louver arrays 6 toward downstream. On the other hand, the dust and rain water are guided into the dust shoots 7 by the louver arrays 6 and fall down in the dust shoots 7. The dust and rain water are then externally discharged through a dust discharge valve 8.

In the driving system cooling device mounted in the electrically powered contructional large size dump truck, the conventional air cleaner tends to permit fine particle dust and rain water to pass through the gaps in the louver arrays together with the air to penetrate into the cooling device to reach the generator, the drive control device and motor of the driving system to lower electrical insulation performance of the driving system to cause damage.

On the other hand, as disclosed in Japanese Examined Patent Publication (Kokoku) 54-4106, there has been proposed a swirl flow type air cleaner formed by assembling a plurality of small diameter tubular bodies, preferably having a diameter less than or equal to 5 cm. However, since the air cleaner for the cooling device of the drive system of the large size dump truck requires a huge capacity, especially as a machine for mines, for low cost and long duration, a large number of small diameter tubular bodies should be used for unacceptably lowering cost-performance. Furthermore, when such a large number is introduced into the small diameter tubular bodies, air induction resistance becomes substantially high, thus causing a lowering of a dust separation performance.

Also, Japanese Unexamined Patent Publication (Kokai) No. 57-56657 proposed a swirl flow type precleaner of a thin panel type which is provided on the top of an element type air cleaner. The disclosed cleaner has mutually opposite vane angles of a swirl type air inlet which are provided at left and right side vanes to generate a gear type swirling flow so as not to disturb laminar flow of the air. The shown arrangement is effective in separating relatively large particle sizes of dust. However, because of a substantially short axis distance of the swirl flow layer of the air, difficulty is encountered in separating fine particle dust. Therefore, the structure must be followed by a pleated type air filtering element at the subsequent filtering stage. Moreover, the pleated type air filtering element requires regular replacement, thus increasing the cost. In addition, when a large amount of air is to be introduced, the intake air flow resistance becomes substantially large to lower dust separation performance.

Japanese Examined Patent Publication No. 57-38302 proposed an air cleaner of the type in which a large spiral type air flow is generated. However, in the shown construction, a rain water eliminating cap may cause a lowering of installation density. On the other hand, when the rain water eliminating cap is removed for higher installation density, bends at the air inlet and outlet may cause a swirling flow of the air at the air inlet and outlet of the element to affect uniform induction of the air to lower the air induction efficiency.

SUMMARY OF THE INVENTION

In view of the problems as set forth above, it is an object of the present invention to provide an air cleaner for a drive system cooling device mounted a large size dump truck, which can separate and remove dust and rain water contained in the air introduced through an air intake.

Another object of the present invention is to provide an air cleaner which is efficient in removing dust and rain water at a less expensive cost, and thus is suitable for application to a vehicle used in a mine where high cost performance is required.

In order to accomplish the above-mentioned object, and in accordance with a primary aspect of the invention, an air cleaner for a cooling device for drive system of a large size dump truck and disposed in a cooling air intake portion for separating and removing dust and rain water contained in an intake air, comprises a plurality of strata tubes horizontally arranged within the air cleaner.

In order to accomplish the above-mentioned object, and in accordance with another aspect of the invention, an air cleaner for a cooling device for drive system of a large size dump truck and disposed in a cooling air intake portion for separating and removing dust and rain water contained in an intake air, comprises a plurality of strata tubes horizontally arranged within the air cleaner, a net attached to the front face of an air intake and extending overall surface thereof, and a cover arranged in front of the net.

Each strata tube may extend between a front end wall and a rear end wall of a rectangular parallelpiped shape box forming the air intake, and have an air inlet opening at a front portion, a spiral screw type vane disposed in the front half and fixed onto the inner periphery thereof, a hollow portion positioned at the intermediate portion, a smaller diameter cylindrical pipe separately formed and inserted through and fixed on the read end wall for forming an air outlet opening, an annular clearance defined between the outer periphery of the smaller diameter pipe and the inner periphery thereof, and a discharge opening formed through the periphery at the corresponding position to the clearance.

In addition, the cover may be vertically elongated rectangular parallelepiped configuration and has a straightening vane of an essentially cross shaped cross section fixed to the inner side of the front face thereof and extended to the front face of the net.

As set forth above, according to the present invention, the air cleaner for a drive system in the large size dump truck includes strata tubes arranged horizontally. The air and so forth is introduced from the outside into the strata tube to generate a swirl flow therein to carry the dust and rain water toward the inner periphery of the strata tube. The dust and rain water thus carried are accumulated in a dust trap and externally discharged through a dust discharge valve. With this construction, the dust and rain water contained in the introduced cooling air can be separated and removed so that only air is fed to a passage pipe downstream of the air cleaner to flow into the cooling device to cool respective components of the drive system. By this, the dust and rain water can be separated and removed from the air with high efficiency to significantly reduce induction of the dust and rain water to be introduced into the cooling device. Therefore, lowering of the electrical insulation performance in the drive system can be prevented and possibility of failure can be eliminated to improve durability of the device.

In the preferred construction, each of individual stratum tube is provided with a sufficiently large diameter for providing a satisfactory air flow rate for effectively cooling various components of an electric driving system for a constructional large size dump truck.

The above-mentioned and other objects, aspects and advantages of the present invention will become clear to those skilled in the art from the discussion described and illustrated in connection with the accompanying drawings which illustrate preferred embodiments meeting with the principle of the invention.

BRIEF DESCRIPTION OF THE DRAWINGS

FIGS. 2, 3 and 4 are respectively schematic front elevation, back elevation and plan view of the embodiment of FIG. 1;

DETAILED DESCRIPTION OF THE PREFERRED EMBODIMENT

One embodiment of the present invention will be discussed herebelow in connection with the accompanying drawings (FIGS. 1 through 7 and 10).

An electric powering system for a large size dump truck is a system for driving left and right rear wheels 10 by supplying power generated by a generator 3 to drive motors 5 provided for the rear wheels 10. In such system, the temperature of the drive system becomes high. Therefore, a device for cooling the drive system is provided. Typically, an air cooling type cooling device is provided to blow an intake air to the driving system by means of a blower 11.

Figure 6:
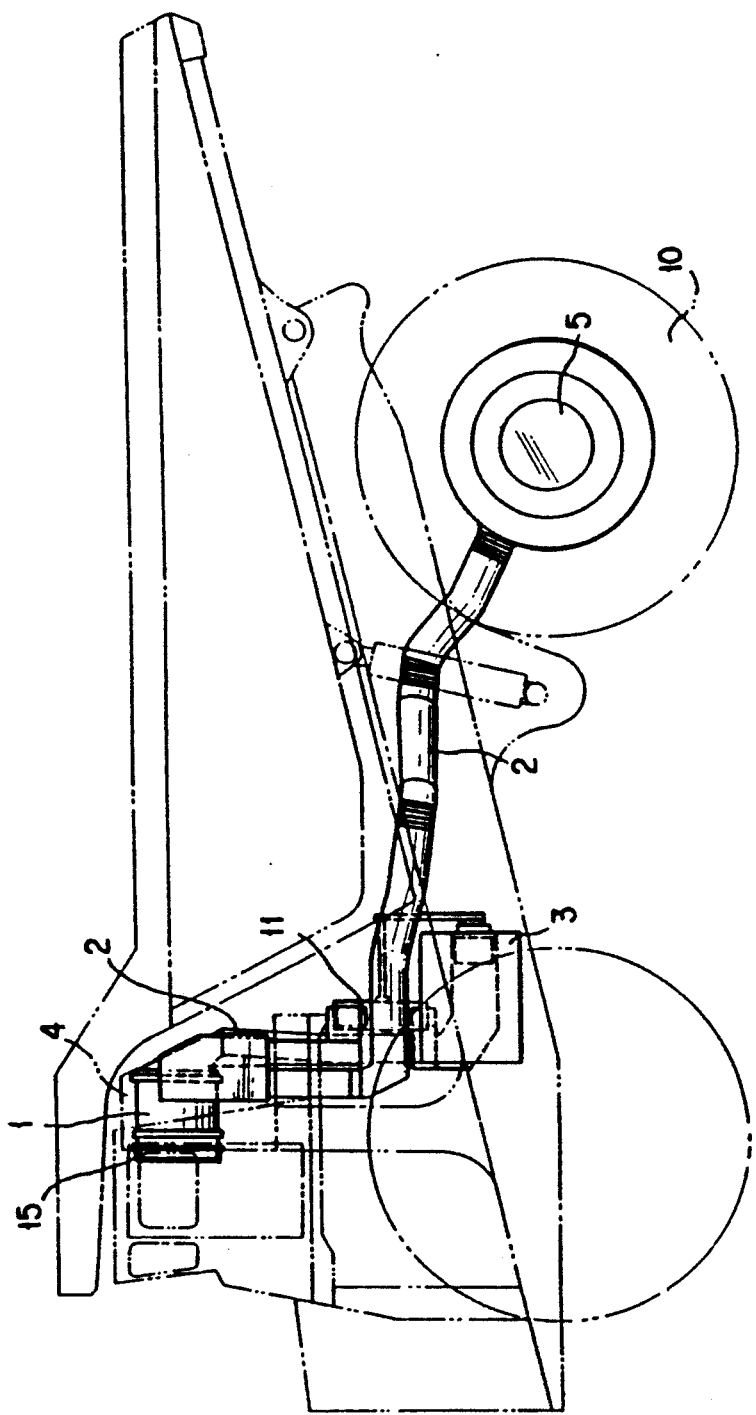
FIG. 6 is a schematic side elevation of a large size dump truck, on which the cooling device incorporating the air cleaner of the present invention is mounted.
Figure 7:
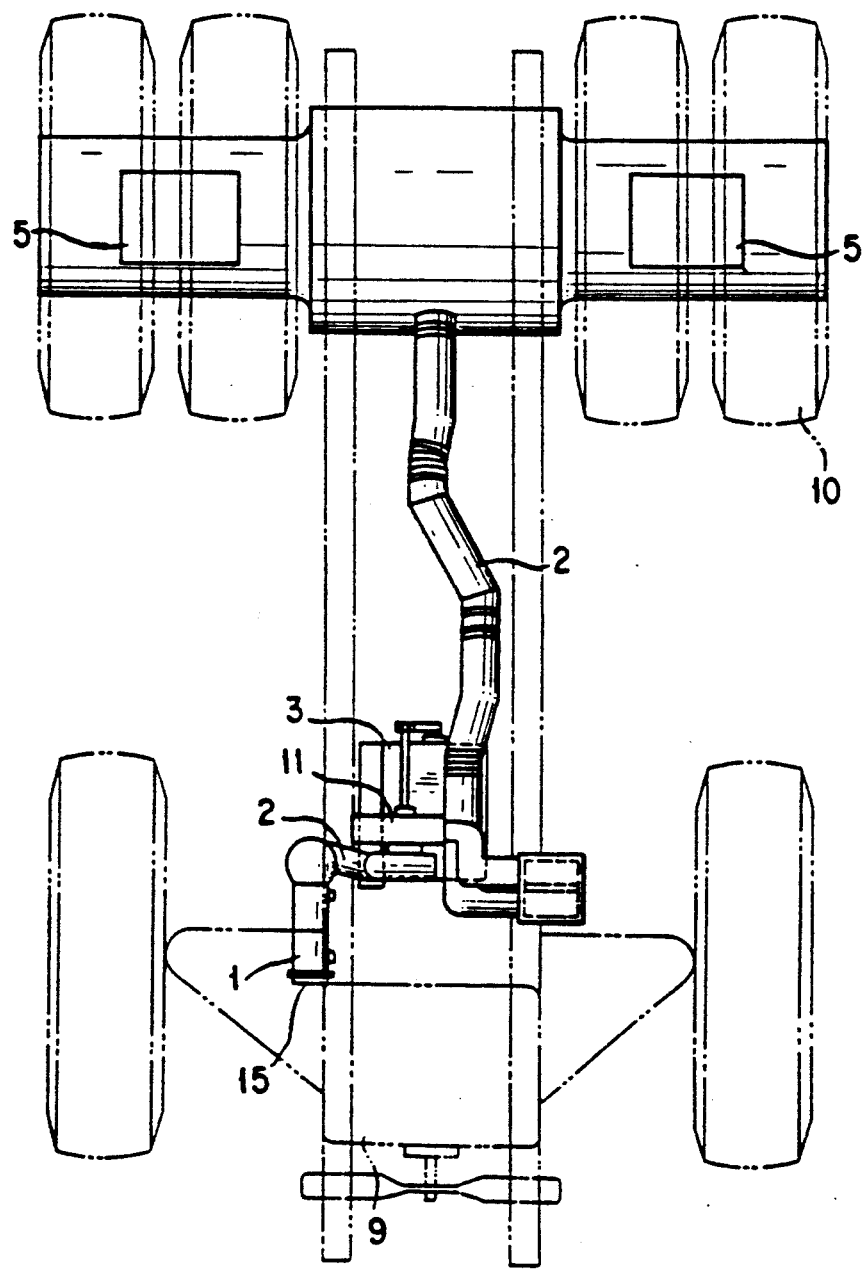
FIG. 7 is a schematic plan view of the large size dump truck of FIG. 6.
Figure 8:
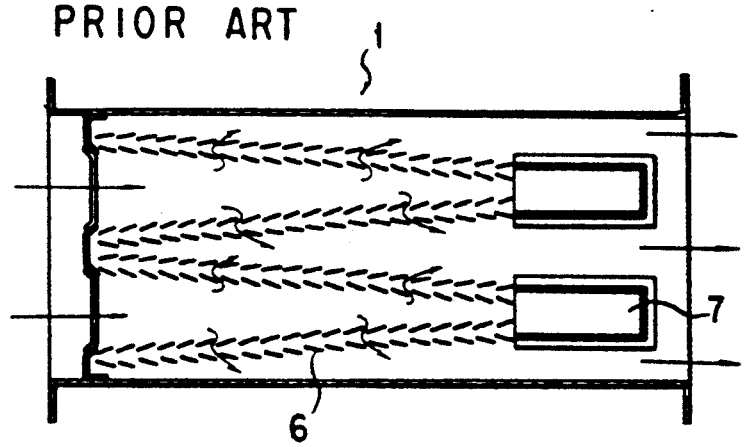
FIG. 8 is a schematic horizontal transverse section showing the conventional air intake and the air cleaner.
Figure 9:
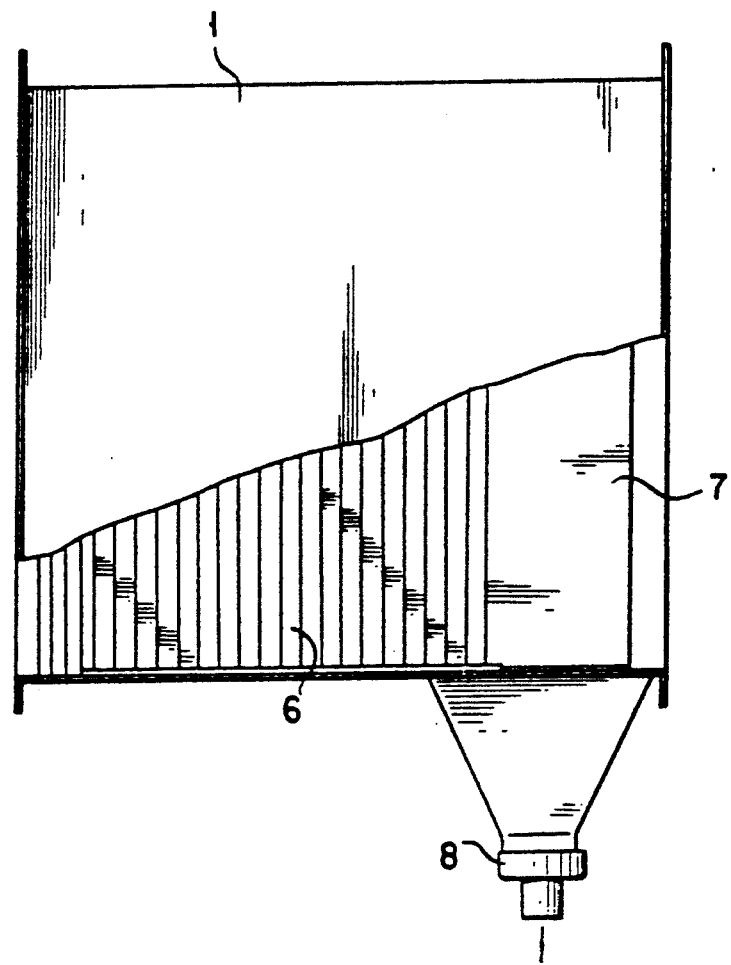
FIG. 9 is a schematic side elevation of the conventional air intake and the air cleaner of FIG. 8.
Figure 10:
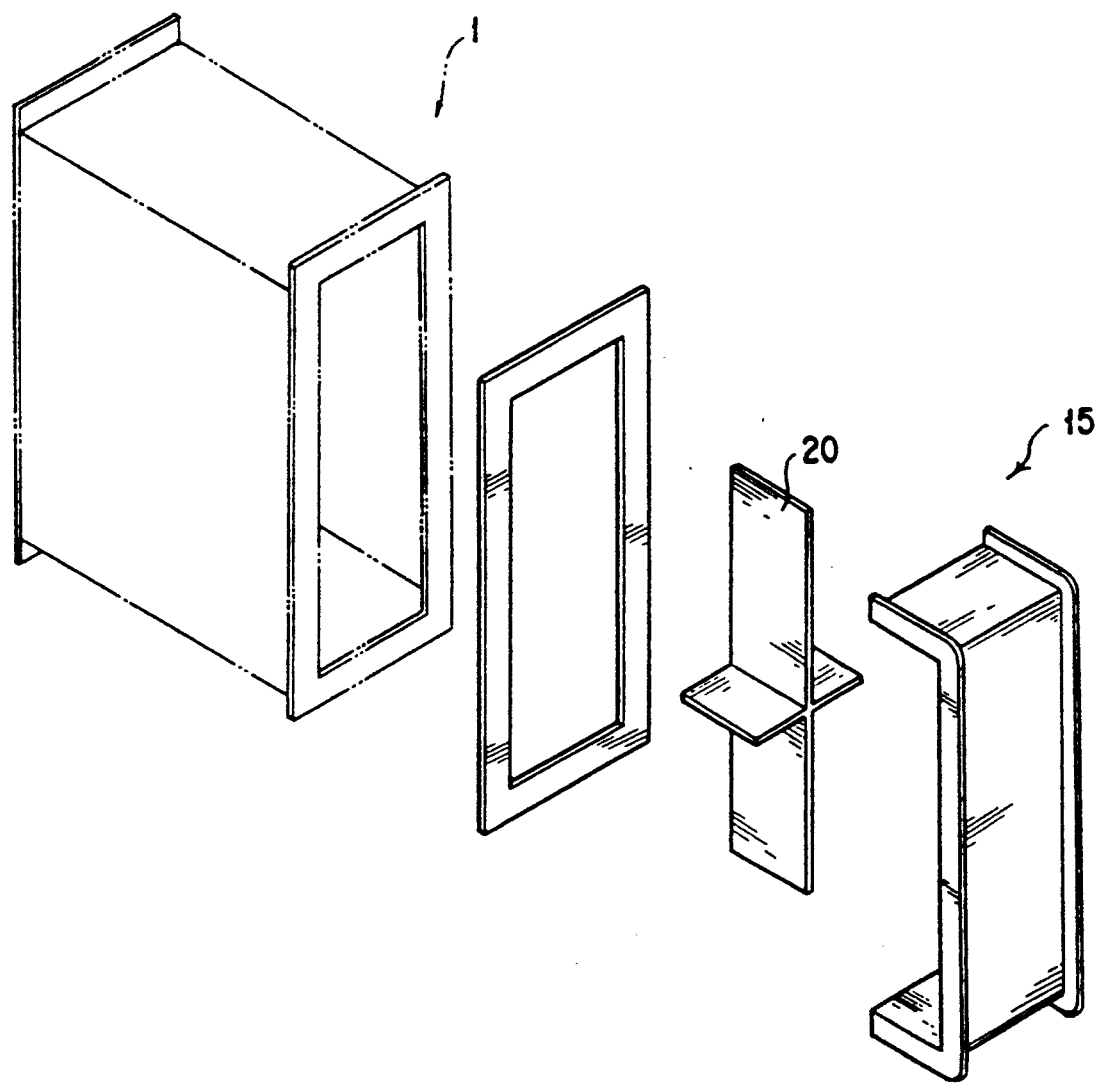
FIG. 10 is an exploded perspective view of a cover employed in the embodiment of the invention.

In detail of the cooling device, as shown in FIGS. 6 and 7, an air intake 1 has a frontwardly directed inlet at the upper front portion of the vehicle. An air cleaner is provided within the air intake for reducing induction of dust, such as sand, and rain water. A passage tube 2 is connected to the downstream side of the air intake 1. A blower 11 powered by a generator 3 is disposed in the passage tube 2. The blower 11 blows the intake air. The passage tube 2 is slitted into two branches at downstream of the blower 11. One of the branches reaches the side surface of the generator 3 and opens thereto for air cooling the generator 3. On the other hand, the other branch reaches within a drive control device 4 provided at the front upper portion of the vehicle and turned backward and further branched toward left and right to respectively reach the drive motors 5 provided for respective of the left and right wheels 10 to open thereto to air cool the drive control device 4 and the motors 5.

Here, the air cleaner, according to the present invention, in the air intake 1 of the cooling will be discussed in connection with FIGS. 1 to 4. The air intake 1 is a rectangular parallelepiped box shaped configuration, within which a plurality of strata tubes 12 are arranged in substantially horizontal fashion. The tube is a registered trademark of Donaldson Company, Inc., Minneapolis, Minn., U.S.A. The front and rear opening ends of the strata tubes 12 are respectively fixed to front end wall 1a and a rear wall 1b. A net 14 is provided for covering overall area of the front face of the air intake. A cover 15 is further arranged at the front side of the net. The passage tube 2 follows the rear end of the air intake 1. A duct trap 16 is arranged at the rear portion of the bottom of the air intake 1. A dust discharge valve 8 is provided in the dust trap 16. With such construction, the air and so forth are introduced into the strata tubes 12 through the cover 15 and the net 14 at the front face of the air intake 1. Within the strata tubes 12, the dust and rain water are separated from the air to flow only air into the passage tube 2 following the rear end thereof. The dust and rain water fall down in the air intake 1 to be accumulated in the dust trap 16 and are then externally discharged through the dust discharge valve 8.

Figure 1:
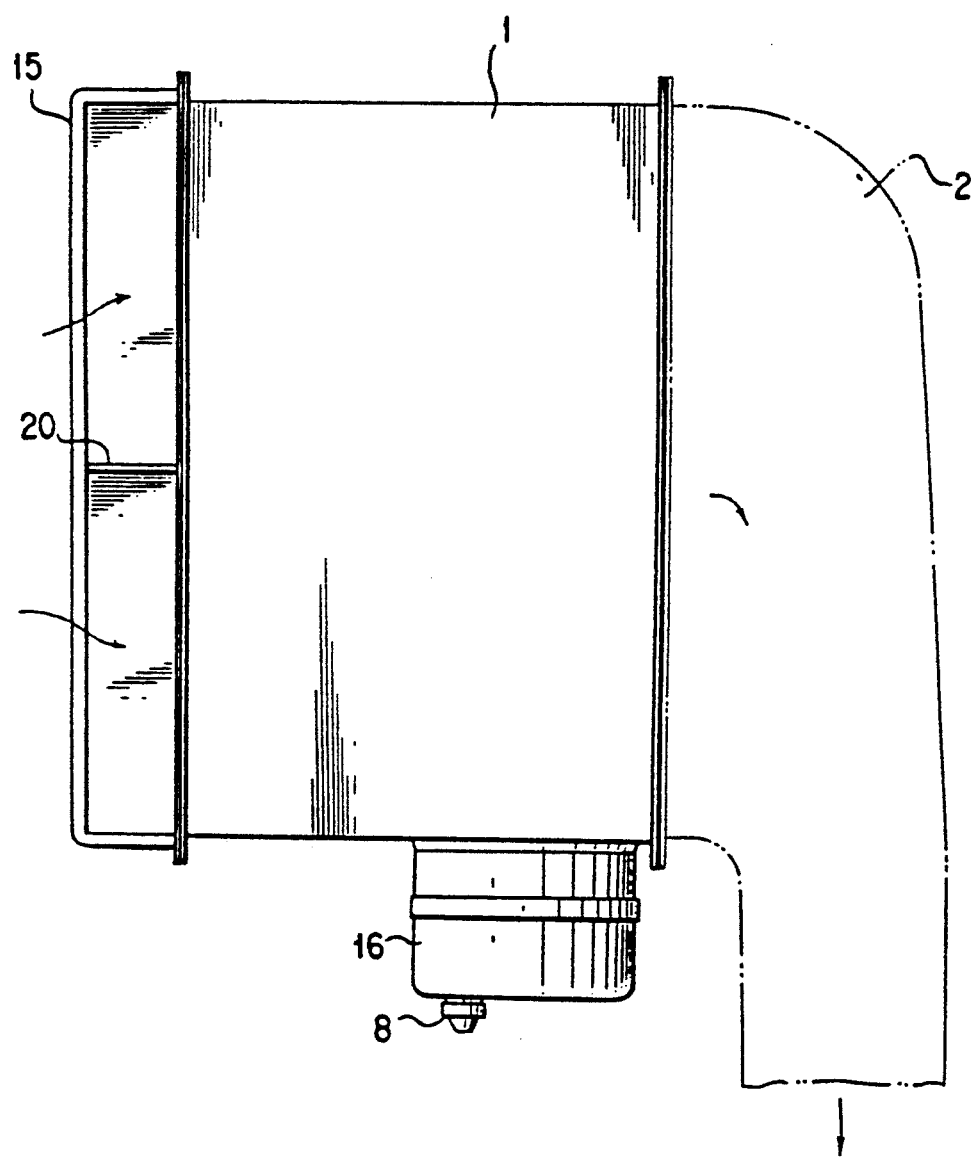
FIG. 1 is a schematic side elevation showing one embodiment of the present invention, in which is illustrated an air intake in a drive system cooling device mounted on a large size dump truck.
Figure 5:
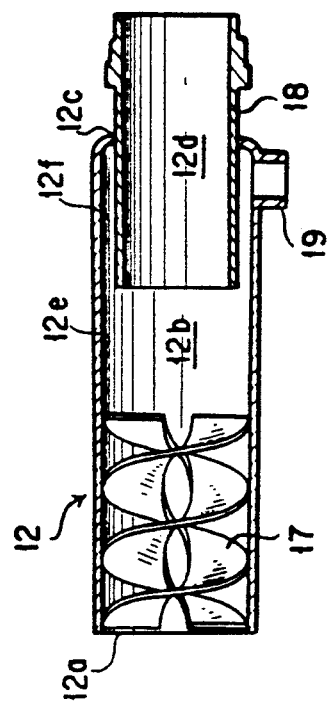
FIG. 5 is a longitudinal section of a strata tube body employed in an air cleaner according to the present invention.

Discussion will be given for a manner of separation of the air and so forth within the strata tube 12. The main body of the strata tube 12 has a circular cross section. As shown in FIG. 5, the main body of the strata tube 12 defines an air inlet opening 12a at the front portion. A spiral screw type vane 17 is fixedly disposed in essentially the front half of the main body of the strata tube 12. The main body of the strata tube 12 defines a hollow portion 12b at the intermediate portion. An air outlet opening 12d is formed by inserting and fixing a smaller diameter cylindrical pipe 18 through a read end wall 12c. The cylindrical pipe 18 is extended into the hollow intermediate portion to define an annular clearance 12f between the inner peripheral wall surface 12e. A discharge opening 19 is defined through the peripheral wall at the position corresponding to the annular clearance 12f. The air and so forth flows into the interior of the strata tube 12 through the inlet opening portion 12a and flows in a spiral fashion by the effect of the vane 17. Then, the dust and rain water are flown toward the inner peripheral wall 12e due to centrifugal force and separated from the air. Therefore, only air flows into the cylindrical pipe 18 at the rear portion through the outlet opening portion 12d. The dust and rain water thus corrected flow into the clearance 12f at the read portion and discharged through the discharge opening 19.

In the air cleaner of the present invention, it is preferred to provide a device having the following construction at the air inlet 1. Namely, at the front face of the air inlet 1, the cover 15 is provided for preventing the dust and rain water from directly penetrating into the air inlet 1. The cover 15 is formed into a rectangular parallelepiped configuration with opening at both sides and rear side. The opening at both sides serve as the air inlet. The rear end opening is in direct communication with the air intake 1 of the cooling device so that the air introduced into the cover 15 is fed into the air intake 1. In order to prevent disturbance of air flow in the air intake 1, i.e. in a plurality of the strata tubes 12 of the air cleaner to lower air flow rate from being caused by the cover 15, a cross sectionally cross shaped straightening plate 20 is disposed within the cover 15 and fixed at the inside of the front face thereof so as to divide the externally introduced air into four parts for orienting the flow. The oriented air flows into the air intake 1. Thus, air supply for the air intake, i.e., the strata tubes 12 of the air cleaner can be done efficiently.

I claim:
1. An air cleaner for a cooling device for a drive system of a large size dump truck and disposed in a cooling air intake portion for separating and removing dust and rain water contained in intake air, comprising:
   a plurality of strata tubes horizontally arranged within the air cleaner;
   a net attached to the front face of said air intake and extending over an entire surface thereof; and
   a cover arranged in front of said net, said cover being in a vertically elongated rectangular parallelepiped configuration and having a straightening vane of an essentially cross-shaped cross-section fixed to the inner side of the front face thereof and extending to the front face of said net.
2. An air cleaner for a cooling device for a drive system of a large size dump truck and disposed in a cooling air intake portion for separating and removing dust and rain water contained in intake air, comprising:
   a plurality of strata tubes horizontally arranged within the air cleaner, each strata tube extending between a front end wall and a rear end wall of a rectangular parallelpiped-shaped box forming said air intake, and having an air inlet opening at a front portion, a spiral screw type vane disposed in the front half and fixed onto the inner periphery thereof, a hollow portion positioned at the intermediate portion, a smaller diameter cylindrical pipe separately formed and inserted through and fixed on said rear end wall for forming an air outlet opening, an annular clearance defined between the outer periphery of said smaller diameter pipe and the inner periphery thereof, and a discharge opening formed through the periphery at the corresponding position to said clearance;
   a net attached to the front face of said air intake and extending over a surface thereof; and
   a cover arranged in front of said net.
3. An air cooling device for an air cooling type driving system for an automotive vehicle, comprising:
   cooling air passage means defining an air inlet opening directed frontwardly and a cooling air passage for directing cooling air to a component of the driving system, said cooling air passage incorporating an air intake portion immediately following said air inlet opening;
   an air cleaner disposed within said air intake portion for removing dust, rain water and other impurities from intake air, said air cleaner incorporating a plurality of axially arranged strata tubes defining a spiral flow portion, in which impurity-containing intake air flows in a spiral fashion, a straight flow portion following said spiral flow portion, and an air/impurity separating portion following said straight portion; and
   a cover plate arranged in front of said air inlet for blocking direct introduction of air into said air intake portion through said air inlet, said cover plate cooperative with said air inlet opening to define at least one laterally opening air induction mouth for introducing the air into said air inlet opening.
4. An air cooling device as set forth in claim 3, wherein said at least one laterally opening air induction mouth comprises laterally opening air induction mouths defined at both lateral sides of said cover plate.
5. An air cooling device as set forth in claim 4, which further comprises a plate member blocking confluent flow of air introduced through both said laterally opening air induction mouths and establishing straight air flow directed to said air inlet at both sides thereof.

* * * * *